March 17, 1959
B. R. GRANBERG ET AL
2,877,677
TRACER CONTROL FOR MACHINE TOOLS
Filed Jan. 27, 1956
2 Sheets-Sheet 2
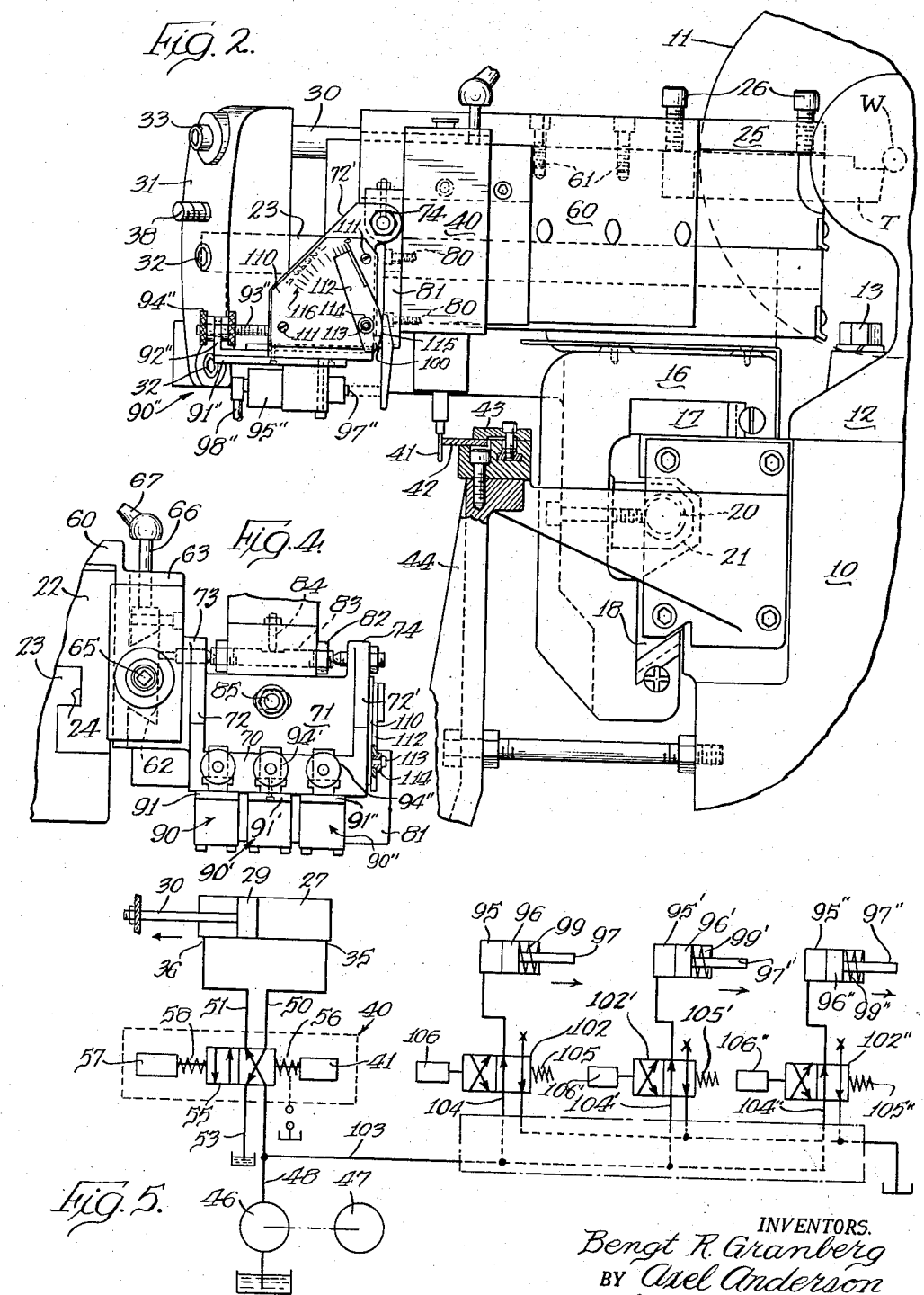
INVENTORS.
Bengt R. Granberg
BY Axel Anderson
Schroeder, Hofgren,
Brady & Wegner
Attys:

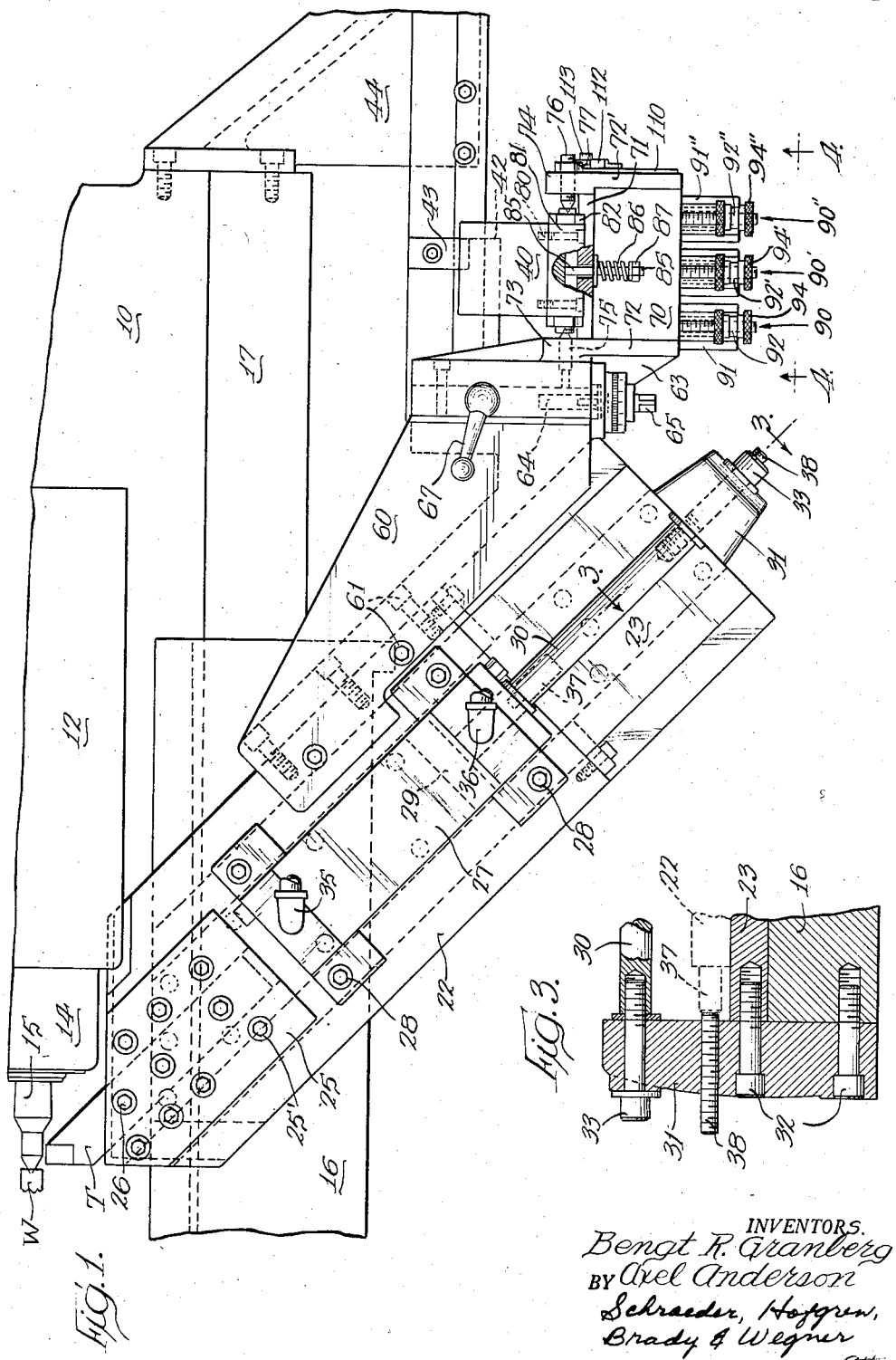

United States Patent Office 2,877,677
Patented Mar. 17, 1959

2,877,677

TRACER CONTROL FOR MACHINE TOOLS

Bengt R. Granberg and Axel Anderson, Rockford, Ill., assignors to Sundstrand Machine Tool Co., a corporation of Illinois Application January 27, 1956, Serial No. 561,839

5 Claims. (Cl. 82—14)

This invention relates to machine tools having a movable element controlled by a tracer stylus riding along a template, and more particularly to a tracer controlled lathe, wherein the movements of a tool support are controlled by a tracer unit which is adjustably mounted so as to permit adjustment of the tracer stylus relative to a tool carried by the support.

It is a general object of the invention to provide, in a machine tool having an element controlled by a tracer unit, new and improved means for adjusting the position of the tracer unit relative to the element.

Another object is to provide, in a machine tool having an adjustable tracer unit and means biasing the tracer unit in one direction of movement, new and improved mechanism for controlling the position of the tracer unit including a plurality of individually operable stop devices for limiting movement of the tracer control unit in opposition to the biasing means.

It is also an object of the invention to provide a new and improved mechanism of the character described in the preceding paragraph for controlling the position of a tracer unit, wherein each of the stop devices includes a slidable support adjustable toward and away from the tracer unit, a stop member on the slidable support movable to and from an operative position, wherein it is engageable with the tracer unit to limit movement of the unit in opposition to the biasing means, a piston and cylinder device on the slide for moving the stop member to an operative position, and spring means for retracting the stop member to an inoperative position, whereby the movable stop members are individually controllable and may all be moved to operative positions with different members projecting different distances toward the tracer unit and then withdrawn individually with the farthest projecting members being withdrawn first so as to permit movement of the tracer unit under urge of the biasing means into engagement with the next longest stop member.

Another object is to provide, in a machine tool of the character described, a new and improved depth-of-cut indicator for indicating the position to which the stop devices are to be adjusted in setting up the machine for operation.

A further object is to provide in a tracer lathe having a tool support, a tracer unit on the tool support for controlling movement of the support, and means biasing the tracer unit in one direction of movement, new and improved control mechanism for adjusting the position of the tracer unit in opposition to the biasing means, the stop device including an adjustable slide carrying a stop member movable to and from an operative position wherein it is engageable with the tracer unit; and an additional, stationary stop carried by the tool support for limiting movement of the tracer unit in opposition to the biasing means when the movable stop member is retracted to an inoperative position.

Other objects and advantages will become readily apparent from the following detailed description taken in connection with the accompanying drawings, in which:

Fig. 1 is a fragmentary plan view of a lathe embodying the present invention;

Fig. 2 is a fragmentary end elevation of the lathe illustrated in Fig. 1;

Fig. 3 is a fragmentary sectional view taken along the line 3—3 of Fig. 1;

Fig. 4 is a fragmentary front elevation taken along the line 4—4 of Fig. 1; and, Fig. 5 is a diagrammatic illustration of a fluid circuit which may be utilized in the lathe illustrated.

While an illustrative embodiment of the invention is shown in the drawings and will be described in detail herein, the invention is susceptible of embodiment in many different forms, and it should be understood that the present disclosure is to be considered as an exemplification of the principles of the invention, and it is not intended to limit the invention to the embodiments illustrated. The scope of the invention will be pointed out in the appended claims.

Referring now to the drawings, and particularly to Figs. 1 and 2, as illustrated, the invention is embodied in a lathe, portions of which are shown in the drawings including a base or bed 10 adapted to rest on a suitable foundation for supporting the operative parts of the lathe. As is conventional, the lathe may include a headstock, not shown, supported on the bed 10 and having a rotatable spindle, not shown, adapted to carry a work-holding chuck, or driver, the outline of which is indicated at 11 in Fig. 2. As seen in Figs. 1 and 2, the bed 10 also supports a tailstock 12 in opposition to the headstock. The tailstock may be secured to the bed 10 by means such as bolts indicated at 13, and includes a reciprocably mounted quill 14 which carries a rotatably mounted tailstock center 15 adapted to be moved toward and away from the headstock on reciprocation of the quill 14 so as to support a workpiece indicated at W between the headstock driver 11 and the tailstock center 15.

The lathe includes a carriage 16 which is supported on the bed 10 for reciprocal movement through feed and return strokes longitudinally of and parallel to the axis of the work supporting means including the headstock driver 11 and the tailstock center 15. Hardened steel ways 17 and 18, provided on the bed 10, engage with cooperating guide surfaces provided on the carriage for slidably mounting the carriage. The carriage is driven by a feed screw 20 which threadably engages with a nut 21 secured to the carriage. The feed screw may be driven in any conventional manner such as by a feed motor provided for this purpose or by means of the drive mechanism for rotating the work driver 11 in the headstock. As described more fully in the copending application of Bengt R. Granberg, Carl H. Johnson, and Axel Anderson, filed August 11, 1954, as Serial No. 449,173, the carriage drive mechanism may be automatically controlled to effect movement of the carriage through successive feed and return strokes to effect the removal of two or more layers of material from a single workpiece W.

The carriage supports a tool slide 22 mounted thereon for movement transversely relative to the direction of carriage movement. For this purpose, the carriage is provided with an upstanding T-shaped guide 23 and the tool slide 22 is formed with a similarly-shaped cooperating guideway 24 which receives the T-shaped guide 23 to movably support the tool slide 22 on the carriage. As seen in Fig. 1, the T-shaped guide 23 formed on the carriage extends angularly toward the axis of the work-supporting means at an angle of about 45° thereto, rather than extending normal to the axis of the work-supporting means, so that the tool slide may be withdrawn away from the axis of the work while the carriage is moving through the feed stroke in a manner to permit the turning of substantially right-angle shoulders on a work piece without requiring interruption of the carriage feed. Adjacent the work-supporting means, the tool slide is formed with a cavity over which a cover plate 25 is mounted and held by screws 25' to form a recess adapted to receive a tool, such as that indicated at T, which may be held by screws 26 in the cover plate 25.

Movement of the tool slide 22 on the carriage is effected by means of a piston and cylinder device including a cylinder 27 fixedly secured on the tool slide by means such as screws or bolts indicated at 28 and having a piston 29 therein. The piston is provided with a piston rod 30 which extends exteriorly from the cylinder 27 and is fixedly anchored to the carriage. As seen in Figs. 1, 2, and 3, for the purpose of anchoring the piston rod 30 to the carriage, at the forward end of the T-shaped guide 23, a vertically extending column 31 is secured to the carriage by means such as the bolts or screws indicated at 32. Adjacent the upper end of column 31, the piston rod 30 is secured thereto by means of a screw 33. As seen in Fig. 1, the cylinder 27 is provided at opposite ends with fittings 35 and 36 by means of which suitable conduits may be connected for supplying fluid under pressure to opposite ends of the cylinder for effecting movement of the tool slide on the carriage. Movement of the tool slide away from the work is limited by a stop member 37 (Figs. 1 and 3) projecting from the slide beneath the piston rod 30 and engageable with an adjustable stop 38 provided on the vertical column 31 of the carriage.

Admission of fluid to the cylinder 27 for effecting movement of the tool slide is controlled by a tracer control valve unit 40 supported for movement with the slide and having a stylus 41 (Fig. 2) extending downwardly therefrom for engagement with a template 42 (see Fig. 1 also) having a pattern extending longitudinally of the axis of the work-supporting means. The template 42 is adjustable, removable, and replaceable, but rigidly secured by clamping means 43 to template supporting means 44 carried by the bed 10 of the lathe.

As seen in the circuit diagram of Fig. 5, fluid under pressure is supplied to the valve unit 40 from a pump 46 driven by an electric motor 47 and connected to the valve unit by a line 48. The valve unit is connected by conduits 50 and 51, respectively, to the fixtures 35 and 36 on the cylinder 27, and by a conduit 53 to tank.

The valve unit 40 may be of the general type described in the copending application referred to hereinabove and includes a slide valve 55 which is normally biased by a spring 56 to a position establishing communication between the pressure line 48 and the conduit 51 to admit fluid to the cylinder 27 through fixture 36 so as to move the cylinder and tool slide away from the work. A solenoid 57 is effective on energization to disable the spring 56 and permit a weaker spring 58 to move the valve to a position establishing communication between the pressure line 48 and the fixture 35 on cylinder 27 to move the slide toward the work. The stylus 41 is universally mounted in the valve unit and functions in response to any movement on contact with the template to move the valve to a position establishing communication between the pressure line 48 and the fixture 36 on the cylinder 27 so as to move the slide away from the work. Thus, on energizing the solenoid 57, the slide moves toward a work piece, and the stylus will engage the template to reverse the valve and move the slide out, but as soon as this happens, the spring 58 moves the valve to a position connecting line 48 and fixture 35, and the slide will move in again. In this manner, the transverse position of the slide is sensitively controlled and, as the carriage is moved longitudinally of the bed through a feed stroke, the cutting tool will follow a path determined by the pattern of the template in a well-known manner. The solenoid 57 is deenergized to effect withdrawal of the tool slide, and as described more fully in the copending application referred to, may be automatically controlled in conjunction with the movements of the carriage to effect withdrawal of the tool slide during return strokes and permit template control of the slide during feed strokes.

Since the position of the tool is controlled by the stylus 41, it will be understood that any adjustment of the valve unit and stylus with respect to the tool and template will effect an adjustment of the tool with respect to the axis of the work-supporting means and the work itself. Accordingly, the valve unit is mounted on the slide in a manner to permit such an adjustment between cutting strokes in order to effect the removal of two or more layers of material from a single work piece on successive feed strokes of the carriage under control of a single template. To this end, the tool slide carries (on the right side as viewed in Fig. 1) a base or supporting bracket 60 rigidly secured thereto by screws 61 and formed with a dove-tailed guide 62 (Fig. 4 extending transversely of the direction of carriage movement). An adjustable bracket 63 is mounted on the dove-tailed guide 62 for adjustment transversely of the axis of the work-supporting means by an adjustment screw 64 threaded into the dove-tailed guide and rotatably mounted in the adjustable bracket 63 but held against axial movement therein. The adjustment screw 64 is formed with a squared-end portion 65 adapted to receive a wrench, and adjustment of the bracket 63 is utilized in "setting up" the lathe to obtain the desired transverse position of the tracer unit relative to the tool. The adjustable bracket 63 may be retained in adjusted positions by a clamping screw 66 having a handle 67 for manual operation.

The adjustable bracket 63 is formed with an L-shaped extension having a horizontally disposed leg 70 (Fig. 1) and a vertically disposed leg 71 (Fig. 4) connected by reinforcing webs 72 and 72'. The vertically disposed leg 71 terminates at its upper end in a pair of horizontally spaced bearing support ears 73 and 74. The ears 73 and 74 carry trunnions 75 and 76, respectively, for pivotally suspending the tracer control unit 40. The trunnion 75 may be tightly fitted in the ear 73 while the trunnion 76 is releasably threaded in ear 74 and held by a lock nut 77 so as to facilitate mounting and dismounting of the tracer control unit.

As best seen in Fig. 2, the tracer control unit 40 is secured by means such as bolts or screws 80 to a vertically disposed, pivoted bracket 81 supported on the trunnions 75 and 76. The bracket 81 is formed with a horizontally extending bore therethrough which receives a rod 83 (Fig. 4) having opposite end portions carried on the trunnions 75 and 76. The bracket 81 is retained against rotation relative to the rod 83 by a lock screw 84 which, when released, permits slidable movement of the bracket 81 relative to the rod 83. Opposite end portions of the rod 83 are exteriorly threaded and carry lock nuts 82 which permit adjustment of the bracket 81 axially relative to the rod 83.

The pivot axis for the tracer unit, provided by the trunnions 75 and 76, may extend in a direction parallel to the axis of the work holding means, in which case pivotal movement of the tracer unit about its pivot axis effects adjustment of the stylus 41 only transversely of the axis of work. Or, the pivot axis may extend in a direction inclined slightly to the axis of the work holding means. In the latter case, as described more fully in the copending application of Granberg et al., referred to above, pivotal movement of the tracer unit about its pivot axis effects adjustment of the tracer stylus in a direction having a component normal to the axis of the work and a component parallel to the axis of the work. By the former component, the stylus is adjusted relative to a surface on the template 42 parallel to the work axis and by the latter component it is adjusted relative to a shoulder on the template intended to guide the tool to form a shoulder on the work. This adjustment of the tracer unit then enables plural cuts on axial surfaces on the work as well as on radial surfaces.

The present invention embraces a new and improved means for controlling the position of the tracer unit relative to the cutting tool during operation of the lathe, and particularly for adjusting the tracer unit after successive feed strokes of the carriage so as to effect the removal of a plurality of layers of material from a single work piece under control of a single template. As seen best in Figs. 1 and 2, the pivoted tracer supporting bracket 81 is biased away from the axis of the work-supporting means through the medium of a rod 85 projecting from the bracket through an opening in the vertically disposed leg 71 and carrying a coil spring 86 bearing against the leg 71 and against nut 87 threaded on the rod. Movement of the tracer unit away from the slide is limited by means of a plurality of individually operable stop devices 90, 90' and 90" which may be controlled to effect adjustment of the tracer stylus relative to the tool between feed strokes of the carriage.

The stop devices 90 are supported in side-by-side relationship on the underside of the horizontally disposed leg 70 of the adjustable bracket 63. The stop devices are all alike and consequently the various parts associated with each have been given similar reference numbers, the numbers relating to the second and third devices being primed and double primed respectively. Each device includes a horizontally disposed slide 91 having a T-shaped cross section (see Fig. 4) and mounted in a similarly shaped slot 91a formed in the leg 70 for adjustment toward and away from the axis of the work-supporting means. For adjustment, each of the slides 91 includes an upturned end portion 92 having an oversized opening therethrough which receives a threaded rod 93 fixed to the bracket 63 and carrying knurled adjusting and locking nuts 94 disposed on opposite sides of the upturned end portion 92. Each of the slides 91 carries on its underside a piston and cylinder device including a cylinder 95 and a piston 96 (Fig. 5), the rod 97 of which functions as a stop member engageable with the pivoted bracket 81 to limit its movement in opposition to the spring 86. Each of the cylinders 95 carries a fitting 98 at one end for supplying fluid under pressure to the cylinder to move the stop member 97 to an operative position. A spring 99 surrounding the rod in the cylinder urges the stop member toward an inoperative position.

A stationary stop member 100 (Fig. 2) on the bracket 63 limits movement of the pivoted bracket 81 when the movable stop members 97 are all retracted to inoperative positions.

It will be appreciated that the adjustable slides 91, 91' and 91" may be adjusted to different transverse positions on the bracket 63 so that when the stop members 97, 97' and 97" are extended, they will project by different amounts toward pivoted bracket 81 to determine different positions for the brackets and with the fixed stop 100 defining an additional position.

As illustrated in the circuit diagram of Fig. 5, admission of fluid to the cylinders 95, 95' and 95" may be controlled by valves 102, 102' and 102", respectively, the valves being connected to the pressure line 48 by means of a main conduit 103 and branch conduits 104, 104' and 104" respectively. Each of the valves 102 is biased to a position establishing communication between the conduit 104 and the associated cylinder 95 by a spring 105 and may be moved to a position connecting the cylinder 95 to tank by means of a solenoid 106.

In operation, the valve solenoids 106, 106' and 106" may be automatically controlled in conjunction with the carriage feed strokes so that at the beginning of a multiple cut cycle, all of the stop members 97, 97' and 97" project to operative positions with the farthest projecting stop member 97", for example, controlling the position of the tracer unit during the first cut. It will be apparent that on extending the stop members 97 to their projected positions one or more of the stop members will be effective to move the tracer unit against the bias of the spring 86, rather than merely opposing movement of the unit by the spring. After the first feed stroke, the solenoid 106" associated with the farthest projecting stop member 97" may be energized to retract the stop member to permit the tracer unit to fall away from the axis of the work-supporting means against the next farthest projecting stop member 97' for example, under the urge of spring 86. This permits the tool to move nearer the work on the succeeding feed stroke to remove an additional layer of material. After each of the two succeeding feed strokes, the other movable stop members 97' and 97 are withdrawn successively in a similar manner so that the fixed stop 100 controls the last or fourth cut. While three movable stops and one fixed stop have been illustrated so as to provide for four cuts on a single workpiece under control of a single template, it will be appreciated that other numbers of movable stops may be provided, or some of those provided may be disabled where other numbers of cuts are desired.

In order to facilitate adjustment of the slides 91 to the desired depth-of-cut positions in setting up the lathe for operation, a depth-of-cut indicator is provided. The indicator comprises a flat plate 110 suitably secured to the outside of the reinforcing web 72' as by machine screws 111. A lever 112 is pivotally mounted on the plate 110 by means of a screw 113 which may be threaded into the horizontal leg 70 on bracket 63 and carries a washer 114 bearing against the lever and the head of the screw.

As seen in Fig. 2, the lever 112 is formed near the lower end with a curved cam surface 115 eccentric of the pivot screw 113 and adapted to bear against the pivoted bracket 81 which carries the tracer unit. When the lever 112 is positioned as illustrated, the cam surface 115 bears against the bracket, but at the point of engagement with the bracket projects only to a point in line with fixed stop 100 and permits the bracket 81 to fall away from the work axis all the way to the stop 100. On pivoting the lever in a counterclockwise direction, as viewed in Fig. 2, the curved cam surface is effective to pivot the bracket 81 so as to move it toward the work axis by amounts dependent on the particular shape of the curved surface 115. The surface 115 may be formed in such a manner that on pivotal movement of the lever the tracer unit will be moved to positions representing likely depths of cuts to be taken on workpieces to be turned in the lathe. A scale 116 is provided on the plate 110 and the scale is calibrated to indicate the depth-of-cut position of the tracer unit for various positions of the lever.

In operation, the lever may be moved to a position on the scale indicating the desired depth of cut. This places the tracer unit in the position it should occupy to effect such a cut. While the tracer unit is thus positioned, the slide 91 which will appropriately control such cut may be moved toward the bracket 81 (with its stop member 97 projecting) until the stop member engages the bracket 81 whereupon the slide will be properly positioned. This operation may be repeated with each of the other slides 91 whereupon the stop devices 90 will all be properly positioned for operation of the lathe. The lever 112 should then be returned to the neutral position illustrated in Fig. 2. The readily visible and easily accessible depth-of-cut indicator greatly facilitates the "setting up" of the lathe in preparing for operation to turn a large number of workpieces of similar size.

We claim:

1. In a machine tool having a tracer control unit, means mounting the tracer control unit for adjustment, and means biasing the tracer control unit in one direction of adjustment, in combination therewith, a plurality of stop devices adjustably mounted and individually engageable with the tracer control unit for limiting movement of the tracer control unit in said direction, and a depth-of-cut indicator for use in setting the positions of the stop devices comprising a lever pivotally mounted and having means engageable with the tracer control unit to move the tracer control unit in opposition to the biasing means for adjustably positioning the tracer control unit on pivotal movement of the lever, and a depth-of-cut scale for indicating the depth-of-cut position of the tracer control unit for different positions of the lever so as to indicate the position to which the stop devices should be adjusted.

2. In a tracer lathe having a tool support movably mounted, a tracer control unit on the tool support for controlling movement of the tool support, means mounting the tracer control unit on the tool support for adjustment, and means biasing the tracer control unit in one direction of adjustment, in combination therewith, a plurality of individually operable devices on the tool support for limiting movement of the tracer control unit in said direction each including a slide adjustably mounted on the tool support for movement toward and away from the tracer unit and a stop member mounted on the slide for movement to and from a position in which it is engageable with the tracer control unit; and a depth-of-cut indicator for use in setting the positions of the slides comprising a lever pivotally mounted on the tool support and having a cam surface engageable with the tracer control unit to move and to limit movement of the tracer control unit in opposition to the biasing means for adjustably positioning the tracer control unit on pivotal movement of the lever, and a depth-of-cut scale for indicating the depth-of-cut position of the tracer control unit for different positions of the lever.

3. In a tracer controlled lathe having a movable tool support, a tracer control unit for controlling movement of the tool support, means mounting the tracer control unit for pivotal adjustment on the tool support relative to a tool carried thereby, and a spring biasing the tracer control unit in one direction of adjustment; in combination, a plurality of individually operable stop devices mounted on the tool support for successively limiting movement of the tracer control unit in said direction, each of said stop devices comprising a slide adjustably mounted on the tool support for movement toward and away from the tracer control unit, a stop member on the slide movable to and from an operative position wherein it is engageable with the tracer control unit to limit movement of the tracer control unit in said direction, a piston and cylinder device on the slide for moving the stop member to an operative position, and spring means for retracting the stop member to an inoperative position; and an additional, stationary stop on the tool support for limiting movement of the tracer control unit in said direction when all the movable stop members are retracted to inoperative positions, whereby the movable stop members may all be moved to operative positions with different members projecting different distances toward the tracer control unit and then withdrawn individually after successive machining operations with the farthest projecting members being withdrawn first, so as to permit the removal of multiple layers of material from a single work piece under control of a single template.

4. In a machine tool having a supporting element, a tracer control unit mounted on the supporting element for adjustment, and means biasing the tracer control unit in one direction of adjustment, in combination therewith, a plurality of at least three individually operable control devices mounted on said element for limiting movement of the tracer control unit in said one direction in opposition to said biasing means, each of said devices including a support adjustably mounted on said element for movement toward and away from the tracer control unit, means for adjusting support on said element, a member mounted on said support for movement to and from a position in which it is engageable with the tracer control unit for determining the position thereof in opposition to the biasing means, means urging said movable member in a direction away from the operative position, and a piston and cylinder device for moving the movable member to operative position.

5. In a machine tool having a support, a tracer unit mounted for adjustment on the support, and means biasing the tracer unit in one direction of movement, control mechanism for regulating the position of the tracer unit on the support comprising, a plurality of individually operable stop members mounted on the support and extending different distances toward the tracer unit for limiting movement of the tracer unit in opposition to said biasing means, separate piston and cylinder devices, one associated with each stop member for moving the associated stop member to an operative position wherein it is engageable with the tracer unit for determining the position thereof, and separate spring means for retracting the stop members to inoperative positions.

References Cited in the file of this patent

UNITED STATES PATENTS

| | | |
|---|---|---|
| 1,805,964 | Wallis | May 19, 1931 |
| 2,361,453 | Casella | Oct. 31, 1944 |
| 2,376,405 | Turchan | May 22, 1945 |
| 2,389,653 | Turchan | Nov. 27, 1945 |
| 2,490,128 | Henkes | Dec. 6, 1949 |
| 2,641,151 | Lee | June 9, 1953 |
| 2,674,139 | Stern | Apr. 6, 1954 |
| 2,678,579 | Siekmann | May 18, 1954 |
| 2,693,125 | Von Zelewsky | Nov. 2, 1954 |
| 2,777,350 | Doll | Jan. 15, 1957 |

FOREIGN PATENTS

| | | |
|---|---|---|
| 1,087,004 | France | Feb. 18, 1955 |
| 1,091,264 | France | Oct. 27, 1954 |